United States Patent [19]

Cantagrel

[11] Patent Number: 4,924,347

[45] Date of Patent: May 8, 1990

[54] GAS LIGHTNING ARRESTER CONTAINING A MINERAL ADDITION AGENT

[75] Inventor: Michel Cantagrel, Houilles, France

[73] Assignee: Compagnie Industrielle de Tubes et Lampes Electriques Citel, Issy-Les-Moulineaux, France

[21] Appl. No.: 396,151

[22] Filed: Aug. 21, 1989

[30] Foreign Application Priority Data

Sep. 8, 1988 [FR] France ............................... 88 11728

[51] Int. Cl.[5] ............................................... H02H 9/04

[52] U.S. Cl. ............................... 361/120; 313/231.11; 313/643

[58] Field of Search ............... 361/117, 118, 119, 120; 313/231.11, 643

[56] References Cited

U.S. PATENT DOCUMENTS

| | | | |
|---|---|---|---|
| 4,317,155 | 2/1982 | Harada et al. | 361/120 |
| 4,491,893 | 1/1985 | Toda | 361/120 |
| 4,493,004 | 1/1985 | Lange et al. | 361/120 |
| 4,553,063 | 11/1985 | Geibig et al. | 361/120 X |
| 4,665,337 | 5/1987 | Wateke et al. | 313/231.11 |
| 4,723,093 | 2/1988 | Nolan | 313/643 |

FOREIGN PATENT DOCUMENTS

| | | |
|---|---|---|
| 2533078 | 3/1984 | France . |
| WO85/02723 | 6/1985 | PCT Int'l Appl. . |

*Primary Examiner*—Derek S. Jennings
*Attorney, Agent, or Firm*—Armstrong, Nikaido, Marmelstein, Kubovcik & Murray

[57] ABSTRACT

The device relates to a gas lightning arrester comprising a tight enclosure and at least two electrodes (*2a, 2b*). In the enclosure is placed a powdery mineral addition agent. This addition agent is a mixture of elementary or mixed metal oxides globally corresponding to the general formula Al $X_a$ $Y_b$ $O_c$, in which formula X and Y respectively represent at least one alkaline or alkaline-earth metal, a is between 0.02 and 1.5, b is between 0 and 0.25 and c has the necessary value to comply with the valency rules. Can be used for the protection of the telephone lines.

9 Claims, 1 Drawing Sheet

GAS LIGHTNING ARRESTER CONTAINING A MINERAL ADDITION AGENT

The present invention relates to a gas lightning arrester with improved extinguishing characteristics due to the incorporation of a mineral addition agent within the leak-proof enclosure it contains.

It is known that a gas lightning arrester or spark gap is a device aimed to let an overvoltage arising on one of its electrodes pass through to an earth lead.

In normal operation, the electrodes of the lightning arrester are electrically insulated from each other and the arrival of an overvoltage causes, inside the lightning arrester, the ignition of an arc which creates a plasma inside the lightning arrester. If there exists an important voltage between the electrodes concerned, the arc can be maintained well beyond the period of passing through of the overvoltage and it is wanted to avoid this irregularity in operation.

There exist, in the present state of technique, numerous types of lightning arresters. In order to make easier the understanding of the explanations given below, the FIGS. 1 and 2 of the accompanying drawing show two types of lightning arresters commonly available on the market. The lightning arrester of FIG. 1 consists of an alumina insulating cylindrical sleeve 1 comprising, at both ends, metal cups 2*a,* 2*b* which form the electrodes of the lightning arrester. A tight link is provided between the bords of the cups and the sleeve. FIG. 2 shows another type of bipolar lightning arrester consisting of a cylinder metal tube 11, one end of which comprises a bottom along the axis from which is provided a rod 12*b* which forms one of the electrodes of the lightning arrester; the other electrode is a metal rod 12*a* arranged along the axis of tube 11 and connected with same by an insulating glass ring 13, the connection between the glass and the metal of the electrodes comprising a glass-metal welding between the rod 12 and the ring 13, a glass-metal welding between the ring 13 and a cylinder collar which encloses it and a silver/copper brazed joint between said collar and the tube 11.

The types of lightning arresters described above are very commonly used for the protection of telephone lines and must, in this respect, comply with a number of standards. One of these standards provides that the lightning arrester be short-circuited, by passing through of an arc between its electrodes, when it receives an overvoltage higher than a threshold value; but another standard provides that, after the short-circuit-generating peak has disappeared, the insulation be quickly reestablished between both electrodes; after the passing through of an overvoltage, it is tolerated that the arc be maintained for a maximum period of 15 ms. Now, in the telephone systems, the electrode which is connected to the telephone line is, with respect to the other electrode which is connected to the earth, at a voltage $V_o$ which, in the present system, may be e.g. 48 volts. The existence of this voltage $V_o$ causes the arc to have a tendency to be maintained in the enclosure of the lightning arrester, when it has been struck by the passing through of the overvoltage. The higher the voltage existing between the electrodes is, the more important this tendency of the arc to be maintained is. Therefore, it is tried to use lightning arresters having the lighest possible $V_o$ voltages, whilst assuring an extinguishing period within 15 ms.

To increase the value of the $V_o$ voltage, it has already been proposed to introduce into the leak-proof enclosure of the lightning arrester a powdery mineral addition agent consisting of a mixture of barium chloride and sodium chloride. For a lightning arrester of the type shown in FIG. 2, comprising a gazeous atmosphere composed of 50% in volume of argon and 50% by volume of neon, there has been introduced into the enclosure of the lightning arrester a powdery mixture formed by 3% in weight of sodium chloride and 97% in weight of barium chloride and it was therefore possible to guarantee that the $V_o$ voltage to which the lightning arrester can be subjected be at least equal to 72 volts. This value is quite sufficient for telephone systems for which the line is at 48 volts. The use of the above-mentioned chlorides showed however drawbacks, because of the fact that the powder is inside the enclosure, when the lightning arrester is brought to a temperature of 800° C. to melt the silver/copper brazed joint which assures the tightness of the enclosure; and it has been observed that during this heating the powder (barium chloride/-sodium chloride) had a tendency to form, at least partially, a sintered bloc of powder due to the existence of an eutectic (70/30) which melts at about 700° C.; now, this grouping into one bloc occurs hazardously and is prejudicial to the efficiency of the above-mentioned chloride mixture.

Furthermore, it is known that, in order to assure the short-circuiting of a lightning arrester at a low overvoltage value and to stabilize this break-down voltage, there should be introduced into the enclosure of the lightning arrester alkaline or alkaline-earth elements the property of which is to reduce the surface energy required for the cold electron emission. A skilled man of the art thus knew it was advantageous to use alkaline or alkaline-earth metals. The various trials carried out up till now with these metals did however not allow to increase the $V_o$ voltage whilst maintaining an extinguishing period within 15 ms. Now, the new numerical transmission systems (RNIS type) will operate with feed voltage peaks up to 110 volts. It is therefore essential to be able to guarantee that the $V_o$ voltage of the lightning arresters be higher than 110 volts. This characteristic is realized by none of the presently known gas lightning arresters.

The object of this invention is to provide a gas lightning arrester comprising, in its enclosure, a mineral addition agent which, on the one hand, gives a satisfactory starting stability to the lightning arrester and, on the other hand, gives the $V_o$ voltage a value higher than 110 volts.

Therefore, the object of this invention is the new industrial product of which consists a gas lightning arrester comprising at least two electrodes separated from each other by an inert gas contained in a light enclosure, each electrode being electrically insulated from the other one (or the other ones), the enclosure containing an at least partially powdery mineral addition agent, characterized in that the mineral addition agent comprises a metal oxide or a mixture of elementary or mixed metal oxides, globally corresponding to the general formula;

$$Al\, X_a\, Y_b\, O_c \qquad (1)$$

in which formula:

X represents at least one alkaline metal;

Y represents at least one alkaline-earth metal;

a is any number between 0,02 and 1,5;

b is any number between 0 and 0.25;

c is the value required to comply with the valency rules.

When the above-used symbols X or Y represent several chemical elements of the same group, same may be in any proportion between them and, in the general formula (I), the coefficients a and b relate to their aggregate; by way of example, X may represent sodium for three quarters and potassium for one quarter, the aggregate being in the balanced proportion a/1 with respect to aluminium and in the proportion a/b with respect to Y.

It is also expressly stipulated that the mineral addition agent corresponding to formula (I) may be formed by a mixture of elementary oxides, such as $Al_2O_3$ and/or mixed oxides, such as a sodium aluminate or even one single mixed oxide forming a determined compound.

Furthermore, said mineral addition agent may contain, besides the mixture of oxides corresponding to formula (I), other additional mineral compounds, said addition agent having however never to include a radioactive element, so that the lightning arrester complies with the existing standards in this matter.

In a preferred embodiment, the lightning arrester according to the invention contains between 50 mg and 1,400 mg of mineral addition agent per $cm^3$ of enclosure; the mineral addition agent is preferably added into the enclosure in the form of a powder the granulometry of which is not critical; the grains of such a powder may e.g. have a mean particle size ranging between 1 and 100 $\mu$m and viz. close to 10 $\mu$m. The inert gas inside the enclosure is favourably chosen from within the group formed by argon, neon and their mixtures; the argon/neon mixture is preferably determined according to a volume proportion between 1/1 and 1/9.

In the mixtures of formula (I), the preferred ones are those in which X represents sodium, potassium or their mixtures and/or those in which Y represents barium, calcium, strontium or their mixtures. The mixture of formula (I) is preferably a mixture of sodium aluminate and barium aluminate; the proportion (sodium aluminate/barium aluminate) is advantageously between 40/60 and 60/40 in weight.

For a better understanding of the object of the invention, an embodiment will now be described, as a merely illustrating and unrestrictive example, with reference to the accompanying drawing.

In this drawing:

FIGS. 1 and 2 defined hereinabove show the structure of two lightning arresters of the prior art;

Figure 3:
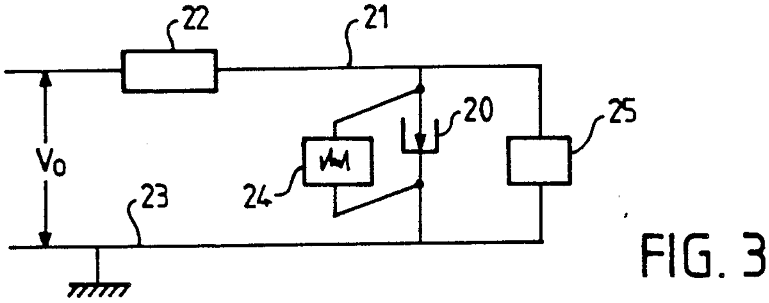
FIG. 3 shows a schematic diagram of a circuit allowing to test a lightning arrester.
Figure 4:
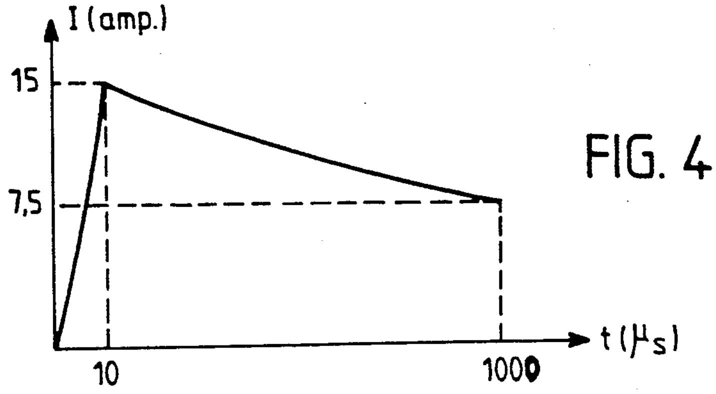
FIG. 4 shows a signal used to carry out a test by means of the circuit of FIG. 3.

In FIG. 3 is shown a circuit allowing to test, according to the French standard, the characteristics of a lightning arrester 20. It is generally considered that the telephone lines correspond to a resistance of 600 ohms; consequently, on a feed line 21 is located a 600 ohms resistor 22; the earth lead has been designated by 23; the voltage of line 21 with respect to line 23 is designated by $V_o$. The lightning arrester is mounted in parallel between the lines 21 and 23; its voltage at the terminals is measured with an oscilloscope 24. At the terminals of the lightning arrester 20 is connected a peak generator 25 which consists of a condenser loaded at 4 KV and a shaping circuit. The generator sends standardized signals, the shape of which is shown in FIG. 4: the overvoltage applied onto the lightning arrester 20 establishes in 10 $\mu$s a current of 15 amperes which drops to half the value in 1,000 $\mu$s (this current wave is defined by standard CEI 60-2). The oscilloscope 24 connected to the terminals of the lightning arrester 20 allows to determine whether said lightning arrester is lighted up (passing through of an arc inside the enclosure), in which case the voltage at the terminals is about ten volts, or off, in which case the voltage at the terminals is equal ot $V_o$. The period of time required for extinguishing after the passing through of the current wave sent by the generator 25 is measured, this measuring being carried out for different voltages, and the the value $V_o$ of the voltage for which the period of time required for extinguishing becomes higher than 15 ms is recorded.

Figure 1:
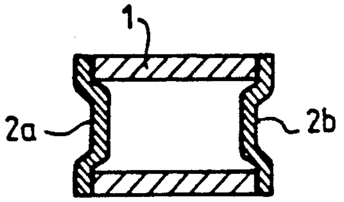
Figure 2:
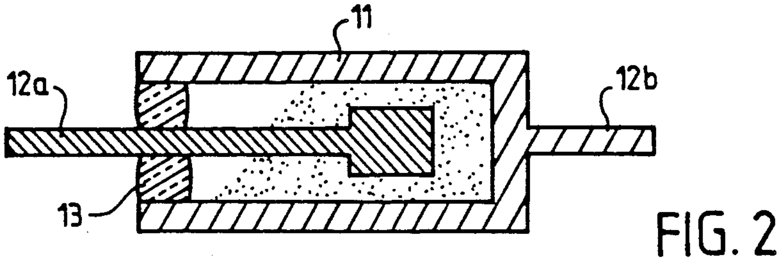

A lightning arrester having the structure shown in FIG. 1 is made. This lightning arrester defines a cylindrical enclosure having an internal diameter of 8 mm and a height of 6 mm. In this enclosure is placed 20 mg of a powdery mineral addition agent consisting of 50% in weight of sodium aluminate ($Al_2O_3$, $Na_2O$) and 50% in weight of barium aluminate ($Al_2O_3$, BaO). The powder is composed of particles having an average size of 10 $\mu$m. The enclosure of this lightning arrester contains a mixture of argon and neon in a ponderal proportion of 50/50 under an absolute pressure of 200 millibar. The characteristics of this lightning arrester are as follows:

Alternating-current resistance: 20 A.

Shock-current resistance ($8\times20$ $\mu$s, according to standard CEI 60-2): 10 KA.

Dynamic striking voltage in the dark: lower than 800 V.

Statistical striking voltage: 250 V$\pm$15%.

$V_o$ voltage for a time period for extinguishing of 15 ms: higher than 140 V.

It can be noticed that the mineral addition agent defined by formula (I) allows to considerably increase the $V_o$ voltage for a time period for extinguishing lower than or equal to 15 ms.

It is of course understood that the embodiment described hereinabove is in no way restrictive and can give rise to any desirable modification without going beyond the scope of the invention.

I claim:

1. Gas lightning arrester comprising at least two electrodes (2*a*, 2*b*; 12*a*, 12*b*) separated from each other by an inert gas contained in a tight enclosure, each electrode being electrically insulated from the other one (or the other ones), the enclosure containing an at least partially powdery mineral addition agent, characterized in that the mineral addition agent comprises a metal oxide or a mixture of elementary or mixed metal oxides, globally corresponding to the general formula:

$$Al\,X_a\,Y_b\,O_c \qquad (1)$$

in which formula:

X represents at least one alkaline metal;

Y represents at least one alkaline-earth metal;

a is any number between 0,02 and 1,5;

b is any number between 0 and 0.25;

c is the value required to comply with the valency rules.

2. Lightning arrester according to claim 1, characterized in that it contains between 50 and 1,400 mg of mineral addition agent per $cm^3$ of enclosure.

3. Lightning arrester according to any of claims 1 or 2, characterized in that the inert gas in the enclosure is chosen from among the group formed by argon, neon and their mixtures.

4. Lightning arrester according to claim 3, characterized in that the inert gas is a argon/neon mixture in volume proportions between 1/1 and 1/9.

5. Lightning arrester according to claim 1, characterized in that X represents sodium, potassium or their mixtures.

6. Lightning arrester according to claim 1, characterized in that Y represents barium, calcium, strontium or their mixtures.

7. Lightning arrester according to claim 1, characterized in that the mineral addition agent is a mixture of sodium aluminate and barium aluminate.

8. Lightining arrester according to claim 7, characterized in that the balanced proportion (sodium aluminate/barium aluminate) in the mineral addition agent is between 40/50 and 60/40.

9. Lightning arrester according to claim 1, characterized in that the mineral addition agent contains, besides the mixture of oxides of formula (I), at least an additional mineral compound.

* * * * *